United States Patent
Ikeda et al.

(10) Patent No.: US 9,017,588 B2
(45) Date of Patent: Apr. 28, 2015

(54) METHOD AND APPARATUS FOR PRODUCING AN ELECTROPHOTOGRAPHIC BLADE MEMBER

(75) Inventors: Takako Ikeda, Ushiku (JP); Kenichi Mochizuki, Ushiku (JP); Kouji Okano, Joso (JP); Takashi Wakabayashi, Ushiku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1023 days.

(21) Appl. No.: 13/044,856

(22) Filed: Mar. 10, 2011

(65) Prior Publication Data

US 2011/0233813 A1    Sep. 29, 2011

(30) Foreign Application Priority Data

Mar. 26, 2010 (JP) ................. 2010-072928
Nov. 17, 2010 (JP) ................. 2010-256854

(51) Int. Cl.
| | |
|---|---|
| *B29C 43/08* | (2006.01) |
| *G03G 15/08* | (2006.01) |
| *C08G 18/10* | (2006.01) |
| *C08G 18/20* | (2006.01) |
| *C08G 18/22* | (2006.01) |
| *G03G 21/00* | (2006.01) |

(52) U.S. Cl.
CPC ............ *G03G 15/0812* (2013.01); *C08G 18/10* (2013.01); *C08G 18/2027* (2013.01); *C08G 18/225* (2013.01); *C08G 2105/02* (2013.01); *G03G 21/0017* (2013.01)

(58) Field of Classification Search
CPC ....................................................... B29C 41/28

USPC .......................................... 264/212; 425/373
See application file for complete search history.

(56) References Cited

U.S. PATENT DOCUMENTS

| | | | |
|---|---|---|---|
| 5,776,395 A * | 7/1998 | Fujiwara et al. | 264/146 |
| 7,619,052 B2 | 11/2009 | Inoue et al. | |
| 7,785,095 B2 * | 8/2010 | Clune et al. | 425/363 |

(Continued)

FOREIGN PATENT DOCUMENTS

| | | |
|---|---|---|
| CN | 101206444 A | 6/2008 |
| CN | 101279501 A | 10/2008 |

(Continued)

OTHER PUBLICATIONS

Notification of First Office Action dated Jul. 4, 2012, in Chinese Application No. 201110081028.9.

*Primary Examiner* — Galen Hauth
(74) *Attorney, Agent, or Firm* — Fitzpatrick, Cella, Harper & Scinto (57) ABSTRACT

A method of producing an electrophotographic blade member includes a continuous molding groove in an peripheral surface and an endless belt, in which the blade member includes a polyurethane resin cured a polyurethane composition having a viscosity of 500-3,000 mPa·s and including A)-D), and a position at which the composition is injected is set, on the belt, opposing to the groove, the position being away from a portion at which the molding drum and the belt are first contacted on an upstream for a moving direction of the belt: A) polyisocyanate; B) adipate-based polyester polyol having a number average molecular weight of 1,000-4,000; C) chain extender having a molecular weight of 200 or less; D) isocyanurate-forming catalyst at 20 to 500 ppm and a urethane-forming catalyst at 200-1,500 ppm.

7 Claims, 2 Drawing Sheets

(56) References Cited

U.S. PATENT DOCUMENTS

| | | |
|---|---|---|
| 8,095,050 B2 | 1/2012 | Iwata et al. |
| 8,150,300 B2 | 4/2012 | Ikeda et al. |
| 8,204,424 B2 | 6/2012 | Miki et al. |
| 2006/0229425 A1* | 10/2006 | Inoue et al. ............ 528/44 |
| 2008/0247791 A1 | 10/2008 | Iwata et al. |
| 2008/0260440 A1 | 10/2008 | Mochizuki et al. |
| 2009/0014912 A1 | 1/2009 | Ikeda et al. |
| 2010/0008707 A1* | 1/2010 | Sako et al. ............ 399/350 |
| 2010/0150628 A1 | 6/2010 | Miki et al. |

FOREIGN PATENT DOCUMENTS

| | | |
|---|---|---|
| CN | 101342772 A | 1/2009 |
| CN | 101588904 A | 11/2009 |
| CN | 101617277 A | 12/2009 |
| JP | 57-201276 A | 12/1982 |
| JP | 7-334060 A | 12/1995 |
| JP | 2645980 B2 | 5/1997 |
| JP | 10-15967 A | 1/1998 |

\* cited by examiner

METHOD AND APPARATUS FOR PRODUCING AN ELECTROPHOTOGRAPHIC BLADE MEMBER

BACKGROUND OF THE INVENTION

1. Field of the Invention

The present invention relates to a method and an apparatus for producing an electrophotographic blade member such as a cleaning blade and a developer amount regulating blade used in an image forming apparatus, such as an electrophotographic copier, a laser beam printer, and a facsimile, utilizing an electrophotographic process.

2. Description of the Related Art

Conventionally, as a developing apparatus in an image forming step of an electrophotographic apparatus such as an electrophotographic copier, a laser beam printer, and a facsimile, there has been widely used one including a developer carrier and a developer amount regulating blade. The developer carrier, such as a roller, is provided to be partially exposed at an opening portion of a developer container containing developer (toner), and the developer amount regulating blade includes an electrophotographic blade member which is made of a rubber material or the like and is brought into contact with the surface of the developer carrier. Further, as a cleaning device in a photosensitive body cleaning step of the electrophotographic apparatus, there has been widely used a cleaning blade in which the electrophotographic blade member is joined to a support body in order to remove residual toner on the photosensitive body and repeatedly perform transferring after performing transferring on a recording sheet.

The developer amount regulating blades are generally formed of a rubber plate, a metal thin plate, a resin plate, and a laminated body formed of those plates. The kinds of the developer amount regulating blades are selected depending on developer to be used. As one of the generally-used developer amount regulating blades, there may be given one including an electrophotographic blade member which is brought into press contact with the developer carrier, and a supporting member for supporting the electrophotographic blade member at a predetermined position. For the electrophotographic blade member, a polyurethane resin is usually used because it is excellent in mechanical characteristics such as abrasive resistance.

The cleaning blade includes a metal supporting member for bonding the blade to the apparatus or the like, and an electrophotographic blade member which is formed of an elastic body and formed integrally with the supporting member. For the electrophotographic blade member, the polyurethane resin is usually used because it is excellent in abrasive resistance and permanent deformation.

The above-mentioned electrophotographic blade including the electrophotographic blade member made of the polyurethane resin is conventionally produced by any one of the following production methods.

One production method is called a centrifugal molding method. In the centrifugal molding method, a raw material is put in a cylindrical die to be rotated at high speed, and then is infilled on an inner peripheral surface by the centrifugal force to be subjected to thermosetting, to thereby mold a thin cylindrical sheet. The cylindrical sheet thus obtained is released from the cylindrical die, subjected to secondary crosslinking as needed, and then cut into a predetermined dimension. Thus, the electrophotographic blade member is produced. Then, by bonding one side edge portion of the electrophotographic blade member to the supporting member by an adhesive or the like, the cleaning blade and the developer amount regulating blade are completed as finished products.

Another production method is called a die molding method. In the die molding method, the supporting member on which the adhesive or the like is applied in advance is set in split dies, and the raw material is injected into the split dies to be subjected to thermosetting, to thereby integrally mold the supporting member and the electrophotographic blade member. After that, the split dies are opened, and the molded product is taken out. In order to ensure edge (edge line) accuracy, one side surface side of the molded product may be sometimes cut after the molding.

Those methods leave room for improvement in terms of the following points. First, the centrifugal molding method performs batch processing, which is difficult to realize continuous automation. Further, the die molding method requires preparation of a large number of dies for mass production, and also requires a curing oven. As a result, the size of the entire apparatus is increased, which leads to an increase in space to be ensured and apparatus cost.

As a conventional method for molding a polyurethane sheet continuously, the following method is provided. Specifically, a liquid of polyurethane prepolymer as a raw material component of thermosetting polyurethane and a liquid of a crosslinking agent are mixed and stirred to be discharged into the heated die having the continuous recessed sectional shape, and then are heated and pressurized, to thereby continuously mold the electrophotographic blade member having a constant width and a belt-like shape. In this technology, it is possible to continuously mold the electrophotographic blade member, and facilitate and simplify automation of a producing step. In addition, it is possible to reduce facility cost.

In recent years, also in the technical field of electrophotography, cost competition is being increased, and a production method with improved productivity is demanded to reduce cost. For the electrophotographic blade member using the polyurethane resin, an improvement of production efficiency, which is realized by making the curing time shorter, and downsizing of the apparatus are demanded.

However, in a case of using the raw material composition of the polyurethane resin which is formed of the polyurethane composition with the short curing time, when injected into a groove with a recessed sectional shape of a heated molding drum, the composition starts to cure directly after being brought into contact with the molding drum. Thus, the curing progresses from the surface that is held in contact with the molding drum, and a difference is made in curing timing between the surface held in contact with the molding drum and a surface that is thereafter brought into contact with the endless belt. Consequently, irregular curing occurs. As a result, there is a fear that, due to occurrence of marks in appearance such as sink, intrusion of air bubbles, and the like, provided is a molded product that cannot satisfy the function as the electrophotographic blade member.

Further, in a case of using the raw material composition of the polyurethane resin formed of the polyurethane composition with the short curing time, and injecting the composition into the groove with the recessed sectional shape of the heated molding drum, the curing progresses before the composition is sandwiched by the endless belt. Thus, there is a fear that a predetermined thickness cannot be obtained even when the raw material composition of the polyurethane resin, in which the curing has progressed, is sandwiched by the endless belt (for example, see Japanese Patent No. 2645980).

Further, as another conventional method for continuously molding a sheet using the polyurethane resin, the following is given. Specifically, as the apparatus for continuously molding the sheet by the molding drum and the endless belt, the molding drum having a molding surface formed over an entire periphery of the outer peripheral surface, the endless belt being brought into press contact with a part of the outer peripheral surface of the molding drum, there is described a thermosetting elastomer continuous molding apparatus, in which pressurizing is performed by a back pressure roll from the back surface of the endless belt. In this technology, continuous pressurizing is performed and a pressurizing force is large, and hence the continuos molding apparatus involving no pressure nonuniformity can be provided, with the result that intrusion of air bubbles into the molded product can be prevented.

In this method, the back pressure roll is provided on the back surface of the endless belt, and intrusion of air bubbles is prevented by high load tension of the endless belt, with the result that the configuration of the apparatus is complex. Thus, an increase in size of the apparatus, an increase in cost of the apparatus, and complexity of setting and adjusting of the apparatus are problems to be solved (for example, see Japanese Patent Application Laid-Open No. H10-15967).

SUMMARY OF THE INVENTION

It is an object of the present invention to provide a production method and a production apparatus, for continuously molding a high-quality electrophotographic blade member having less irregularities of physical properties such as hardness and exhibiting less occurrence of marks in appearance and less occurrence of intrusion of air bubbles, by using a polyurethane resin including a polyurethane composition for a short curing time.

In addition, it is another object of the present invention to provide a production method and a production apparatus that are capable of continuously producing a high-quality electrophotographic blade member using a polyurethane resin including a polyurethane composition for a short curing time, exhibiting high production efficiency, and contributing to reducing facility cost, the production apparatus having such a structure which easily realizes automation.

The object is achieved by a method of producing an electrophotographic blade member according to the present invention, including: a mixing and stirring step; an injection step; a thermosetting step; a releasing step; and a cutting step, the method using a molding drum including a continuous molding groove in an outer peripheral surface and an endless belt brought into contact with a part of the outer peripheral surface of the molding drum, in which: the electrophotographic blade member is made of a polyurethane resin, which is obtained by thermosetting a polyurethane composition containing at least the following: (A) a polyisocyanate; (B) an adipate-based polyester polyol having a number average molecular weight of 1,000 to 4,000; (C) a chain extender having a molecular weight of 200 or less; and (D) an isocyanurate-forming catalyst at 20 ppm or more and 500 ppm or less and a urethane-forming catalyst at 200 ppm or more and 1,500 ppm or less as curing catalysts, wherein the polyurethane composition has a viscosity of 500 mPa·s or more and 3,000 mPa·s or less after completion of the mixing and stirring step and before the injection step; and wherein in the injection step, an arrangement position of the polyurethane composition is set, on the endless belt, at a position opposing to the molding groove, the position being away from a position at which the molding drum and the endless belt are first brought into contact with each other on an upstream side with respect to a moving direction of the endless belt.

According to the present invention, it is possible to provide the production method and the production apparatus, for continuously molding a high-quality electrophotographic blade member having less irregularities of physical properties such as hardness and exhibiting less occurrence of marks in appearance and less occurrence of intrusion of air bubbles, by using a polyurethane resin including a polyurethane composition for a short curing time.

In addition, it is also possible to provide the production method and the production apparatus that are capable of continuously producing a high-quality electrophotographic blade member using a polyurethane resin including a polyurethane composition for a short curing time, exhibiting high production efficiency, and contributing to reducing facility cost, the production apparatus having such a structure as easily realizing automation.

Further features of the present invention will become apparent from the following description of exemplary embodiments with reference to the attached drawings.

DESCRIPTION OF THE EMBODIMENTS

Hereinafter, the present invention is described in detail.

A method of producing an electrophotographic blade member according to the present invention includes: a mixing and stirring step; an injection step; a thermosetting step; a releasing step; and a cutting step, the method using a molding drum including a continuous molding groove in an outer peripheral surface and an endless belt brought into contact with a part of the outer peripheral surface of the molding drum, in which: the electrophotographic blade member is made of a polyurethane resin, which is obtained by thermosetting a polyurethane composition containing at least the followings (A) to (D); the polyurethane composition has a viscosity of 500 mPa·s or more and 3,000 mPa·s or less after completion of the mixing and stirring step and before the injection step; and in the injection step, an arrangement position of the polyurethane composition is set, on the endless belt, at a position opposing to the molding groove, the position being away from a position at which the molding drum and the endless belt are first brought into contact with each other on an upstream side with respect to a moving direction of the endless belt: (A) a polyisocyanate; (B) an adipate-based polyester polyol having a number average molecular weight of 1,000 to 4,000; (C) a chain extender having a molecular weight of 200 or less; and (D) an isocyanurate-forming catalyst at 20 ppm or more and 500 ppm or less and a urethane-forming catalyst at 200 ppm or more and 1,500 ppm or less as curing catalysts.

[Basic Configuration of Electrophotographic Blade]

An electrophotographic blade according to the present invention is a blade used as a cleaning blade, a developing blade, or the like for an electrophotographic apparatus such as a copier, a laser beam printer, an LED printer and apparatus where an electrophotographic technology is applied, such as electrophotographic plate making systems. The blade has a configuration in which an electrophotographic blade member formed from a polyurethane resin produced by using a polyurethane composition and a supporting member are bonded. The shapes of the supporting member, the electrophotographic blade member, and the like are not particularly limited, and any shape suitable for their intended purposes may only be adopted.

Further, materials for forming the supporting member are not particularly limited, and the supporting member can be produced from metal and resin, more specifically, from a metal material such as a steel plate, a stainless steel plate, a zinc-plated steel plate with a chromate film, and a chromium-free steel plate and a resin material such as nylon 6 and nylon 6,6. A method of bonding a supporting member and an electrophotographic blade member is not particularly limited, and any method suitable for their bonding may only be selected from known methods.

[Polyurethane Composition]

(Polyisocyanate (A))

Examples of the polyisocyanate (A) to be blended into the above-mentioned polyurethane composition include 4,4'-diphenylmethane diisocyanate (4,4'-MDI), isophorone diisocyanate (IPDI), 4,4'-dicyclohexylmethane diisocyanate (hydrogenated MDI), trimethylhexamethylene diisocyanate (TMHDI), tolylene diisocyanate (TDI), carbodiimide-modified MDI, polymethylene phenyl polyisocyanate (PAPI), ortho-toluidine diisocyanate (TODI), naphthylene diisocyanate (NDI), xylene diisocyanate (XDI), hexamethylene diisocyanate (HMDI), para-phenylene diisocyanate (PDI), lysine diisocyanate methyl ester (LDI), and dimethyl diisocyanate (DDI). Of those, 4,4'-MDI is preferably used. Those polyisocyanates may be used alone or as a mixture of two or more kinds thereof.

(Adipate-Based Polyester Polyol (B))

Specific examples of the polyol (B) to be blended into the above-mentioned polyurethane composition include adipate-based polyesters such as polyethylene adipate ester polyol, polybutylene adipate ester polyol, polyhexylene adipate ester polyol, polyethylene-propylene adipate ester polyol, polyethylene-butylene adipate ester polyol, and polyethylene-neopentylene adipate ester polyol. Those polyols may be used alone or as a mixture of two or more kinds thereof.

The polyol (B) to be blended into the above-mentioned polyurethane composition is a polyol having a number average molecular weight of 1,000 to 4,000. It is not preferred to use a polyol having a number average molecular weight of less than 1,000 as the polyol (B), because the number average molecular weight in total of the polyols becomes smaller, and hence the physical properties of the polyurethane resin to be obtained tend to be low. On the other hand, a polyol having a number average molecular weight of more than 4,000 is not preferred, because sink marks on the surface of an electrophotographic blade member and curing irregularities are apt to occur easily.

(Chain Extender (C))

As the chain extender (C) to be blended into the above-mentioned polyurethane composition, for example, a glycol is used. Examples of such glycol include ethylene glycol (EG), diethylene glycol (DEG), propylene glycol (PG), dipropylene glycol (DPG), 1,4-butanediol (1,4-BD), hexanediol (HD), 1,4-cyclohexanediol, 1,4-cyclohexanedimethanol, p-xylylene glycol (terephthalyl alcohol), and triethylene glycol. Alternatively, other polyhydric alcohols other than the above-mentioned glycols may also be used. Examples of such polyhydric alcohol include trimethylolpropane, glycerin, pentaerythritol, and sorbitol. Those polyhydric alcohols may be used alone or as a mixture of two or more kinds thereof.

A chain extender having a molecular weight of 200 or less is used as the chain extender (C). When the molecular weight of the chain extender (C) exceeds 200, aggregation of hard segments occurs less and physical properties of the resin to be obtained decreases. As a result, characteristics necessary as an electrophotographic blade member may not be provided.

(Isocyanurate-Forming Catalyst and Urethane-Forming Catalyst (D))

Curing catalysts (D) to be blended into the above-mentioned polyurethane composition include an isocyanurate-forming catalyst at 20 ppm or more and 500 ppm or less, and a urethane-forming catalyst at 200 ppm or more and 1,500 ppm or less. Note that ppm is based on mass in the present invention.

An isocyanurate-forming catalyst is used to realize the reduction in the reaction and curing time of a polyurethane composition, enabling the reduction in size of a molding apparatus, the reduction in cost of the apparatus, and the improvement in production efficiency of the apparatus. Further, an isocyanurate-forming catalyst provides a polyurethane composition with sensitivity to temperature. As a result, the reaction of the polyurethane composition is delayed at room temperature, and heating the polyurethane composition promotes curing, resulting in the progress of an efficient curing reaction. Besides, combined use of a urethane-forming catalyst can yield a urethane resin that has characteristics necessary as an electrophotographic blade member.

When the content of an isocyanurate-forming catalyst is less than 20 ppm, it takes a long time for a polyurethane composition to cure, leading to the increase in size of an apparatus and the increase in cost of the apparatus. On the other hand, when the content of an isocyanurate-forming catalyst is more than 500 ppm, a polyurethane composition starts curing while the polyurethane composition is mixed and stirred. As a result, a discharging outlet for a polyurethane composition is contaminated, causing harm such as intrusion of foreign matter and occurrence of marks, which are not suitable for an electrophotographic blade member. Besides, the curing reaction of the polyurethane composition becomes faster, and hence the polyurethane composition may not spread sufficiently in a molding groove after its injection, probably resulting in the occurrence of a molding defect or the like. It is preferred that the content of an isocyanurate-forming catalyst in a polyurethane composition be 50 ppm or more and 300 ppm or less.

In addition, when the content of a urethane-forming catalyst is less than 200 ppm, the rate of a urethane-forming reaction accounting for all reactions in a polyurethane composition decreases. As a result, physical properties necessary as an electrophotographic blade member are not provided. Besides, an irregular reaction occurs, resulting in occurrence of marks on the surface. When the content of a urethane-forming catalyst is more than 1,500 ppm, a polyurethane composition starts curing while the polyurethane composition is mixed and stirred. As a result, a discharging outlet is contaminated by the polyurethane composition, causing harm such as intrusion of foreign matter and occurrence of marks, which are not suitable for an electrophotographic blade member. It is more preferred that the content of a urethane-forming catalyst in a polyurethane composition be 300 ppm or more and 1,000 ppm or less.

Examples of the isocyanurate-forming catalyst include tertiary amines such as N-ethylpiperidine, N,N'-dimethylpiperazine, and N-ethylmorpholine. Further examples include one kind or a mixture of: hydroxides and organic weak acid salts of tetraalkylammoniums such as tetramethylammonium, tetraethylammonium, and tetrabutylammonium; hydroxides and organic weak acid salts of hydroxyalkylammoniums such as trimethylhydroxypropylammonium and triethylhydroxypropylammonium; and metal salts of carboxylic acids such as acetic acid, propionic acid, butyric acid, caproic acid, capric acid, valeric acid, octylic acid, myristic acid, and naphthenic acid. Of those, preferred are metal salts of carboxylic acids, which have property of starting a curing reaction by heating, that is, sensitivity to temperature, and do not affect other parts by blooming after molding. Those catalysts may be used alone or as a mixture of two or more kinds thereof.

In addition, a generally used catalyst for polyurethane hardening may be used as the urethane-forming catalyst, and examples thereof include a tertiary amine catalyst. Such catalyst is further exemplified by: amino alcohols such as dimethylethanolamine; trialkylamines such as triethylamine; tetraalkyldiamines such as N,N,N',N'-tetramethyl-1,3-butanediamine; triethylenediamine; piperazine-based catalysts; and triadine-based catalysts. Alternatively, a metal catalyst which can be typically used for urethane may also be used, and is exemplified by dibutyltin dilaurate or the like. Those catalysts may be used alone or as a mixture of two or more kinds thereof.

(Viscosity)

Further, a polyurethane composition has a viscosity of 500 mPa·s or more and 3,000 mPa·s or less after completion of mixing and stirring and before injection.

When a polyurethane composition having a viscosity of less than 500 mPa·s is arranged on an endless belt, its fluidity as a polyurethane composition is too high. Thus, the polyurethane composition flows and spreads on the endless belt. As a result, even if the polyurethane composition is brought into contact with a molding drum later, the polyurethane composition cannot fill the molding groove of the molding drum, and hence the blade member to be obtained is not provided with a size and thickness necessary as an electrophotographic blade member. On the other hand, a polyurethane composition having a viscosity of more than 3,000 mPa·s has too low a fluidity, such that the polyurethane composition does not spread over in the molding groove. As a result, the blade member to be obtained is not provided with a size and thickness necessary as an electrophotographic blade member, either. From the viewpoints of flowability on an endless belt and filling property in a molding drum, it is more favorable that a polyurethane composition has a viscosity of 800 mPa·s or more and 2,000 mPa·s or less after the polyurethane composition is mixed and stirred.

(Polyol (E))

As a chain extender (C) having a molecular weight of 200 or less and a polyol (B) having a number average molecular weight of 1,000 to 4,000, which are different in molecular weight, are caused to react with a polyisocyanate (A), the reaction may become nonuniform in the above-mentioned polyurethane composition. As a result of the nonuniform reaction, irregular curing or the like may cause surface marks.

Thus, it is more preferred that the above-mentioned polyurethane composition contain a polyol (E) having a number average molecular weight which is smaller than the number average molecular weight of the polyol (B) and larger than the molecular weight of the chain extender (C). By introducing the polyol (E) having a number average molecular weight between the number average molecular weight of the polyol (B) and the molecular weight of the chain extender (C), the difference in the molecular weight of these compounds varies in a multistep manner. As a result, even in the case where a more rapid reaction occurs by using a catalyst having a good sensitivity to temperature, it is possible to obtain an electrophotographic blade member in which occurrence of surface marks derived from irregular shrinkage is suppressed.

Examples of the above-mentioned polyol (E) include polyesters such as polyethylene adipate ester polyol, polybutylene adipate ester polyol, polyhexylene adipate ester polyol, polyethylene-propylene adipate ester polyol, polyethylene-butylene adipate ester polyol, and polyethylene-neopentylene adipate ester polyol. Those polyols may be used alone or as a mixture of two or more kinds thereof. Alternatively, polyethers such as polyethylene glycol, polypropylene glycol, and polytetramethylene glycol may be used. Those polyethers may be used alone or as a mixture of two or more kinds thereof.

(Ratio of Polyol (E) to Adipate-Based Polyester Polyol (B) and Molecular Weight of their Mixture)

It is preferred that (E)/(B), which is the mass ratio of a polyol (E) to a polyol (B), both being contained in a polyurethane composition, is 0.02 to or more and 0.60 or less. When the mass ratio is set to 0.02 or more, the polyol (E) can contribute to efficiently making the difference in molecular weight between a chain extender (C) and the polyol (B) a multistep difference, and hence the effect of suppressing surface marks caused by irregular shrinkage is more improved. On the other hand, when the mass ratio is set to 0.60 or less, the content ratio of the polyol (E) having a smaller number average molecular weight than the polyol (B) is suitable, and hence the polyurethane resin to be obtained tends to have more suitable physical properties as an electrophotographic blade member.

In addition, it is preferred that the number average molecular weight in total of the above-mentioned polyol (B) and the above-mentioned polyol (E) is 1,000 to or more and 3,000 or less. When the number average molecular weight is 1,000 or more, the polyurethane resin to be obtained has more suitable physical properties as an electrophotographic blade member. Further, when the number average molecular weight is 3,000 or less, the viscosity of a prepolymer becomes lower, resulting in the improvement in the flowability of the prepolymer into a space formed by a molding groove of a molding drum and an endless belt.

[Method and Apparatus for Producing Electrophotographic Blade Member]

Figure 1:
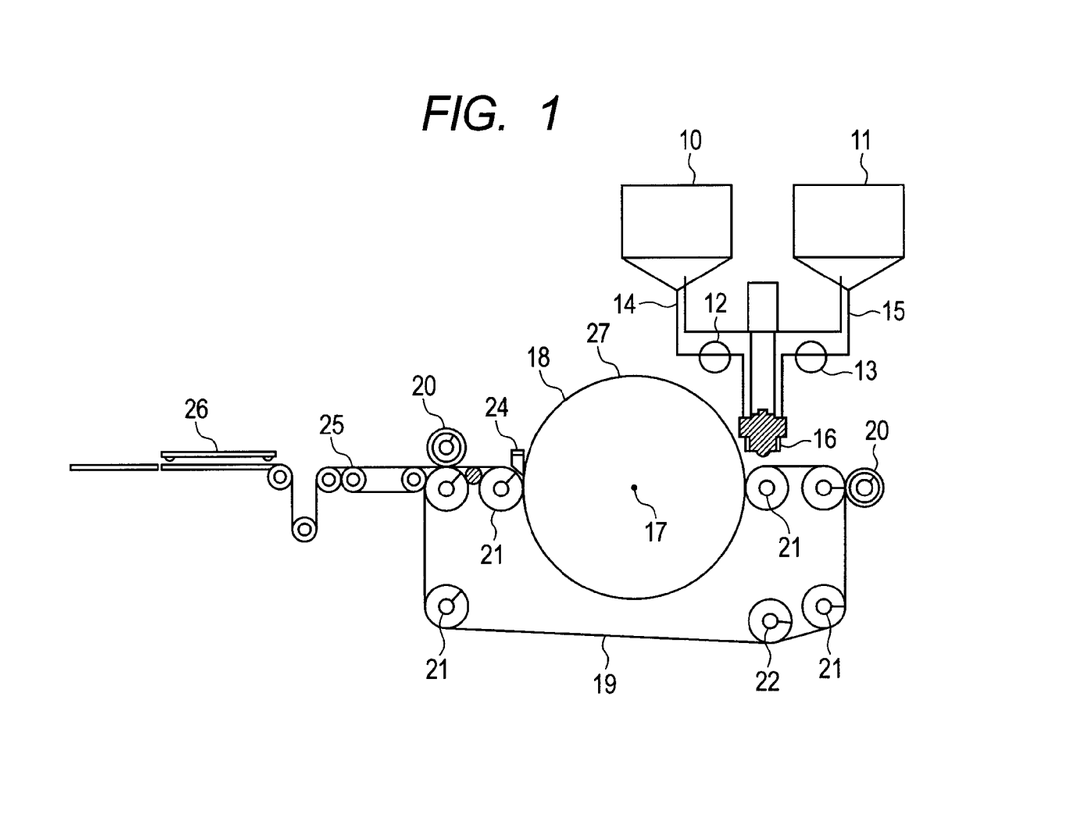
FIG. 1 is a view illustrating an example of an apparatus for producing an electrophotographic blade member according to the present invention.

Hereinafter, a production method and a production apparatus according to an embodiment of the present invention are described with reference to the drawings. FIG. 1 is a schematic view illustrating an example of the apparatus for producing an electrophotographic blade member.

(Measuring, Mixing, and Stirring)

First, a polyurethane composition is measured, mixed, and stirred, to thereby prepare the mixture. As illustrated in FIG. 1, an apparatus for mixing and stirring the polyurethane composition includes at least two tanks 10 and 11. Further, outlets of the respective tanks are connected to a mixing head 16 through measuring pumps 12 and 13, and the mixing head 16 and the tanks 10, 11 are connected to each other through discharge/circulation pipes 14 and 15. In addition, the mixing head 16 has a known structure in which a stirring rotator is provided in a chamber including an inlet and an outlet for a liquid, and can discharge the polyurethane composition with high accuracy. By using such a quantitative mixer, a certain amount of the polyurethane composition is supplied to the mixing head by the measuring pumps, and mixed and stirred uniformly.

(Injecting)

Figure 2:
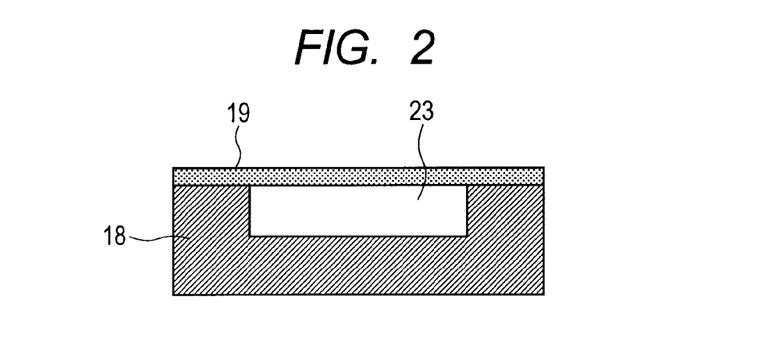
FIG. 2 is a sectional view illustrating an example of a part of a space surrounded by a molding groove of a molding drum and an endless belt in the apparatus for producing an electrophotographic blade member according to the present invention.

Next, a molding apparatus has a configuration in which a molding drum 18 and an endless belt 19 are provided. The molding drum 18 has a continuous molding groove for the electrophotographic blade member formed in its outer peripheral surface in a rotating direction, and the endless belt 19 is arranged so as to cover the molding groove at a part of the outer peripheral surface of the molding drum 18. Further, the molding apparatus includes heating means which is arranged to be embedded in the molding drum 18 or close to the molding drum 18, or to be intimate contact with or close to the endless belt 19 side of a portion at which the molding drum 18 and the endless belt 19 are brought into press contact with each other. The polyurethane composition injected into the molding groove can be subjected to thermosetting by the heating means within a space portion 23 surrounded by the molding groove on the molding drum 18 and the endless belt 19 as illustrated in FIG. 2.

The molding drum 18 is made of, for example, hard aluminum, iron, and stainless steel. A center portion of the molding drum is rotatably supported by a horizontal rotation shaft 17, and the molding drum is rotated at a predetermined speed by a drive device.

Figure 3A:
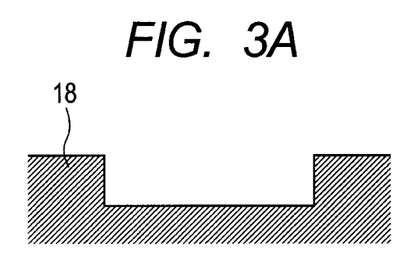
FIG. 3A is a sectional view illustrating an example of a part of the molding groove (rectangular shape) formed in the molding drum in the apparatus for producing an electrophotographic blade member according to the present invention.
Figure 3B:
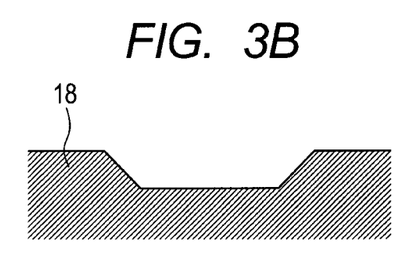
FIG. 3B is a sectional view illustrating an example of a part of the molding groove (trapezoid shape) formed in the molding drum in the apparatus for producing an electrophotographic blade member according to the present invention.

The shape of the molding groove formed continuously in the outer peripheral surface of the molding drum 18 is selected as needed in conformity with the shape of the electrophotographic blade member to be produced. For example, the molding groove may have a rectangular shape in cross-section as illustrated in FIG. 3A, and a trapezoid shape in cross-section as illustrated in FIG. 3B.

Further, the endless belt 19 is formed of, for example, a metal strip made of stainless steel or the like. A resin belt or the like made of other than stainless steel can implement a mechanism, but it is preferred that means capable of heating from the outer side of the resin belt be used at that time.

The endless belt 19 is wound around a driving roll 20 having a drive mechanism different from that for the molding drum 18, guide rolls 21 for regulating running of the endless belt, and a tension roll 22 for applying tension to the endless belt 19. The molding drum 18 and the endless belt 19 are rotated at the same peripheral speed.

Further, it is preferred that the molding drum 18 and the endless belt 19 have different drive means, because it is possible to reduce the tension of the endless belt 19. The drive means may be implemented by combination of, for example, a motor, a clutch, and a brake. However, it is preferred that, in order to make the molding drum 18 and the tension of the endless belt 19 constant according to the peripheral speed of the molding drum 18, the molding drum 18 be driven by a motor and the endless belt 19 be driven by a powder brake and a motor. Note that, it is preferred that the peripheral speed of the molding drum 18 and the peripheral speed of the endless belt 19 be set in consideration of a defect of the endless belt 19, marks of a molded product, and the like.

It is preferred that the tension of the tension roll 22 for applying tension to the endless belt 19 be set to be equal to or lower than the tension, under which the endless belt 19 is pressed against the molding drum 18, in consideration of an influence on the tension during driving of the endless belt 19, a bend of the endless belt 19, and the like.

As a heating method of the heating means, there may be employed a heating method from the outside or the inside of the molding drum 18. Heating from the outside is influenced by disturbance (room temperature, etc.), and hence internal heating in which the molding drum 18 is directly heated is preferred. Means such as a heater, oil, and water may be employed as the means for performing the internal heating, but the heater is most suitable in view of space saving and temperature control. It is desired that heating be performed within a predetermined temperature ±5° C. in consideration of appearance abnormality and the like of a molded product.

In the apparatus illustrated in FIG. 1, the mixing head 16 as a raw material arranging means is provided with the discharging outlet from which the polyurethane composition can be discharged at a predetermined speed. The polyurethane composition in the mixing head 16 is discharged from the discharging outlet, to thereby be arranged on the endless belt 19. At this time, the molding drum 18 and the endless belt 19 are rotated at the predetermined speed, and a necessary amount corresponding to the space portion (groove) formed by the molding drum 18 and the endless belt 19 is injected continuously. Note that, in the present invention, the position of the discharging outlet is referred to as a discharge position.

According to the method of the present invention, the polyurethane composition is arranged, on the endless belt 19, at a position opposed to the molding groove, the position being away from a position at which the molding drum 18 and the endless belt 19 are first brought into contact with each other on an upstream side with respect to a moving direction of the endless belt 19. Note that, in the present invention, the above-mentioned position is referred to as an arrangement position.

Here, it is preferred that the discharging outlet position (discharge position) of the mixing head 16 of the quantitative mixer be arranged at an upward distance in a vertical direction of 5 mm or more and 200 mm or less from the arrangement position of the polyurethane composition above the endless belt 19. When the distance is less than 5 mm, the discharging outlet is likely to be brought into contact with the discharged polyurethane composition, and thus the discharging outlet may be contaminated. Consequently, there is a fear that foreign matter intrudes into the injected polyurethane composition, with the result that it may be impossible to obtain the electrophotographic blade member with high quality. When discharged from a position at an upward distance of more than 200 mm, the polyurethane composition is likely to be influenced by the ambient environment such as an air flow around the discharging outlet, and a discharge liquid fluctuates, for example. Thus, in some cases, the polyurethane composition may be arranged to be shifted from an appropriate position on the endless belt 19 corresponding to the molding groove, and air bubbles intrude into the polyurethane composition.

Further, it is preferred that the arrangement position of the polyurethane composition be set, on the endless belt 19, at a position opposing the molding groove, the position being 5 mm or more and 350 mm or less away from the position at which the molding drum 18 and the endless belt 19 are first brought into contact with each other on the upstream side with respect to the moving direction of the endless belt 19. When the above-mentioned position is at a distance of less than 5 mm, in the discharged polyurethane composition, intrusion of air bubbles at the time of injection and nonuniform injection occur, and hence the desired electrophotographic blade member cannot be obtained in some cases. Further, when the distance is larger than 350 mm, the discharged polyurethane composition flows and spreads beyond the width of the space portion (groove), with the result that the desired size (thickness) of the electrophotographic blade member cannot be obtained in some cases. The arrangement position of the present invention is adjusted to the position opposed to the molding groove on the endless belt 19, and an adjusting method may be selected from known art such as a cylinder, a NC (numerical control), and a mechanical stopper.

The curing reaction of the polyurethane composition according to the present invention is accelerated by heating. However, the polyurethane composition is injected onto the endless belt 19 having no heating mechanism, and hence the urethane polymer reaction accelerated by heat does not progress. After the endless belt 19 is brought into contact with the heated molding drum, the temperature of the contact surface thereof rises promptly, and the polyurethane composition injected onto the endless belt 19 moves and fills the molding groove on the molding drum 18 to be heated and pressurized, with the result that the urethane polymer reaction is started. In this way, it is possible to cure the polyurethane composition uniformly without irregularities. When the polyurethane composition is injected into the groove portion on the molding drum 18, the curing progresses from a surface that is first brought into contact with the groove portion, and hence the curing progresses only at a surface brought into contact with the heated molding drum 18 ahead of other portions, and thus there occurs surface marks and nonuniformity of physical properties caused by irregular curing of the surface brought into contact with the endless belt 19. A cooling mechanism for cooling the endless belt 19 may be provided to a portion that is not brought into contact with the molding drum 18.

(Curing)

Next, the polyurethane composition is subjected to thermosetting for a predetermined period of time while caused to fill the space portion 23 formed by the molding groove of the molding drum 18 and the endless belt 19. In this way, the urethane polymer reaction of the polyurethane composition is completed to such an extent that the polyurethane composition is releasable from the molding drum 18 and the endless belt 19, and a prototype of the electrophotographic blade member having a necessary width, thickness, and surface property is formed continuously. Note that, in the embodiment employing the production apparatus illustrated in FIG. 1, it is preferred that the heating temperature range from approximately 80° C. to 200° C., and it takes 20 seconds to 90 seconds for the polyurethane composition to be releasable from the molding drum 18 and the endless belt 19 by development of the urethane polymer reaction. However, if the curing is finished to such an extent that the polyurethane composition is releasable from the molding drum 18 and the endless belt 19, it is possible to perform releasing, and hence it is possible to select the heating temperature and heating time as needed according to the composition of the polyurethane composition and the configuration of the production apparatus.

(Releasing and Cutting)

The polyurethane resin thus subjected to thermosetting is released from the molding drum 18 and the endless belt 19 by releasing means 24.

The released polyurethane resin is conveyed by a conveying mechanism 25, and cut into a predetermined dimension by a cutting mechanism 26. A suitable known method, such as punching and NC cutting using a cutter, may be selected as the cutting method.

(Releasing Treatment)

It is desired that at least a portion of the molding drum 18 with which the polyurethane composition is brought into contact, for example, the molding groove be subjected to the releasing treatment. The releasing treatment includes a method for applying a release agent on a surface of a die using a release-agent treatment device or the like, a method for applying plating, such as plating containing polytetrafluoroethylene (PTFE) or fluorine, on the surface of the molding drum 18, a method for coating a releasable resin such as silicon, and the like. However, as long as a polyurethane resin is releasable, a suitable method may be selected.

Further, it is also desired that at least a portion of the endless belt 19 with which the polyurethane composition is brought into contact be subjected to the releasing treatment. As a method of the releasing treatment, there may be employed a method similar to the releasing treatment performed on the molding drum 18.

(Roughing Treatment)

When the electrophotographic blade member according to the present invention is used for a developer amount regulating blade, it is desired that, at least at a portion of the electrophotographic blade member, which is brought into contact with a developer carrier, a rough surface portion be formed at the portion of the electrophotographic blade member that comes into contact therewith. Note that, the developer amount regulating blade serves as a blade for uniformly regulating an amount of developer in the form of a thin layer while the developer is frictionally charged between the developer carrier and the blade in an electrophotographic apparatus.

In recent years, the electrophotographic process has been advanced to provide higher image quality and higher speed, and hence it is important how the developer amount regulating blade uniformly charges and conveys developer particles. In particular, the surface property of the developer amount regulating blade is especially important because the surface property thereof greatly affects both a conveying force for the developer and a charge amount. Conventionally, it has been considered that, in order to uniformly charge and convey the developer particles, the smoother charge control surface of the developer amount regulating blade is the better. However, in recent years, when specifically studying the influence of the evenness of the charge control surface on uniform charge and conveyance of the developer, it has been found that roughing a developer control surface to some extent can realize the uniform charge and conveyance of the developer, and suppress image defects such as image streaks and image unevenness. Therefore, it is preferred that the rough surface portion be formed at least one corner of a bottom surface in cross-section orthogonal to a longitudinal direction of the molding groove of the molding drum 18 according to the present invention. With this configuration, when the electrophotographic blade member is used for the developer amount regulating blade, at least the portion that is brought into contact with the developer carrier is roughed, and hence it is possible to realize the uniform charge and conveyance of the developer.

Examples of a method for forming the rough surface portion include a method for roughing by a physical method. Specific examples of the physical method include a method for roughing the surface of the molding drum 18 by using sandpaper and a roughing film, a method for providing the rough surface portion in the molding groove, and a shot blasting method such as a sand blasting method. Further, roughing can be performed by a chemical method. Specific examples of the chemical method may include an etching method and a method for forming a layer containing roughed fine particles. It is preferred that the level of roughness range approximately from 2 μm to 25 μm in ten point height of irregularities (RzJIS).

EXAMPLES

The present invention is described based on the following examples, but the present invention is by no means limited by those examples.

Example 1

PBA2000

(Preparation of Thermosetting Polyurethane Composition)

32.0 parts by mass of 4,4'-diphenylmethane diisocyanate (MDI) and 61.0 parts by mass of polybutylene adipate polyester polyol (PBA) having a molecular weight of 2,000 were caused to react for 3 hours under an 80° C. nitrogen atmosphere, yielding a prepolymer containing NCO at 8.8%. On the other hand, 3.9 parts by mass of 1,4-butanediol (1,4-BD), 3.2 parts by mass of trimethylolpropane (TMP), and a urethane-curing catalyst were mixed, yielding a curing agent. An isocyanurate-forming catalyst and a urethane-forming catalyst were used as curing catalysts. There was used, as a polyurethane-curing catalyst, an isocyanurate-forming catalyst with the product name of "P15" (a potassium acetate solution in ethylene glycol (EG), produced by Air Products Japan, Inc.). In this case, the isocyanurate-forming catalyst was blended so as to account for 80 ppm of the resultant polyurethane composition. Further, there was used, as a urethane-forming catalyst, triethylenediamine (product name "DABCO crystal"; produced by Air Products Japan, Inc.). The content of the urethane-forming catalyst was adjusted so that the urethane-forming catalyst accounts for 340 ppm of the resultant polyurethane composition.

Note that there was used, as MDI, a product with the name of "Millionate MT" (produced by Nippon Polyurethane Industry Co., Ltd.). There was used, as PBA having a molecular weight of 2,000, a product with the name of "NIPPOL-LAN 4010" (produced by Nippon Polyurethane Industry Co., Ltd.). There was used 1,4-BD produced by Mitsubishi Chemical Corporation. There was used TMP produced by Mitsubishi Gas Chemical Company, Inc.

The molecular weight of PBA was calculated based on the following mathematical formula. Further, the hydroxyl group value in the formula was calculated according to JIS-K1557-1.

$$\text{Molecular weight} = 1{,}000/\text{Hydroxyl group value} \times \text{The number of functional groups} \times 56.11 \quad [\text{Math. 1}]$$

In this example, the production apparatus illustrated in FIG. 1 was used to produce an electrophotographic blade member. The prepolymer and the curing agent were fed into the tanks 10 and 11, respectively, and were supplied into the mixing head 16 while being measured with measuring pumps 12 and 13, respectively. The prepolymer and the curing agent were uniformly stirred and mixed in the mixing head 16, thereby preparing a polyurethane composition. Table 1 shows the viscosity of the polyurethane composition at this time.

The molding drum 18, which is made of stainless steel, is rotatably supported by the rotation shaft 17 to be positioned approximately horizontally. The molding drum 18 of the molding apparatus has, in the rotating direction, a continuous molding groove having a width of 20 mm and a depth of 1 mm, the groove serving as an original mold for an electrophotographic blade member, and the outer peripheral portion of the molding drum 18 has been subjected to fluoride plating treatment. In this example, the molding drum 18 was rotated at 1.5 rpm by a drive device.

The endless belt 19, which is made of metal, is arranged so as to cover the molding groove of the molding drum 18. Fluoride plating treatment has been performed on the portion with which a polyurethane composition of the endless belt 19 is brought into contact. The endless belt 19 is wound around the driving roll 20 having a drive mechanism different from that for the molding drum 18, the guide rolls 21 for regulating the running of the endless belt, and the tension roll 22 for applying tension to the endless belt. Further, the endless belt 19 was rotated so as to match the peripheral speed of the molding drum 18.

The driving for the molding drum 18 and the driving for the endless belt 19 were constituted differently. Further, in order to make the whole tension of the endless belt 19 and the molding drum 18 constant according to the peripheral speed of the molding drum 18, the molding drum 18 was driven by a motor and the endless belt 19 was driven by a powder brake and a motor.

The arrangement position of a polyurethane composition was set, on the endless belt 19, to the position opposed to a molding groove, the position being 5 mm away from the portion at which the molding drum 18 and the endless belt 19 were first brought into contact with each other on the upstream side with respect to the moving direction of the endless belt 19. Further, the discharge position of a polyurethane composition was set to the position 5 mm above the arrangement position in the vertical direction.

A polyurethane composition injected into the molding groove of the molding drum 18 was subjected to thermosetting for a predetermined period of time (40 seconds) by adjusting the temperature of the molding groove to 135° C. with a cartridge heater built in the molding drum 18. After that, the cured product was released and cut into a piece having a predetermined size by using a punching die with a Thomson blade, to thereby yield an electrophotographic blade member having a thickness of 1 mm.

The electrophotographic blade member thus obtained and an electrogalvanizing steel plate, ZINKOTE 21 (product name: produced by NIPPON STEEL CORPORATION), having a chromium-free surface treatment layer containing an urethane-modified olefin resin and an acrylic-modified olefin resin as a supporting member were bonded by heating using a film-shaped hot melt adhesive, Elphan UH (product name: produced by Nihon Matai Co., Ltd.), as an adhesive, to thereby yield a developer amount regulating blade.

The developer amount regulating blade thus obtained was evaluated for rubber hardness, rubber hardness difference, surface mark caused by irregular curing, intrusion of air bubble and foreign matter, and images by using the following methods. Table 1 shows the results of the evaluation.

(Viscosity)

The viscosity of the polyurethane composition was measured under a measurement environment of 25° C. by using an "SV type viscometer" SV-10 produced by A & D Company, Ltd.

(Measurement of Rubber Hardness and Rubber Hardness Difference)

International Rubber Hardness Degree (IRHD) was measured by using Wallace Microhardness Tester produced by Wallace Instruments (H. W. WALLACE), based on JIS K 6253. An original product of the molded electrophotographic blade member was measured at 5 points with each 500 mm distance. The average value of the resultant values was shown as the rubber hardness and the difference between the maximum value and the minimum value was shown as the hardness difference.

(Curing Irregularity of Surface)

The curing irregularity of the surface of the electrophotographic blade member was checked by visual observation, and the results were evaluated based on the following criteria.
A: No surface mark is present.
B: Surface marks distinguishable in appearance are present.
C: Surface marks having such a level as causing image defects are present.

(Intrusion of Air Bubble and Foreign Matter)

Intrusion of air bubbles and intrusion of foreign matter in the surface of the electrophotographic blade member were each checked by visual observation, and the results were evaluated based on the following criteria.
A: No intrusion of air bubbles and foreign matter is present.
C: Intrusion of air bubbles and foreign matter is present.

(Image Evaluation)

The produced developer amount regulating blade was incorporated into a cartridge for a "LASER SHOT-LBP" (product name, produced by Canon Inc.), and a ghost and image streaks were evaluated based on the following criteria.

Ghost
A: No ghost is present.
B: A ghost is slightly confirmed.
C: A ghost is clearly confirmed.

Image streak
A: No image streak is present.
B: Image streaks are confirmed as a slight change on an image.
C: Image streaks are confirmed as a great change on an image.

Example 2

PBA2000 and PBA1000

27.7 parts by mass of 4,4'-diphenylmethane diisocyanate (MDI) and 52.7 parts by mass of polybutylene adipate polyester polyol (PBA) having a molecular weight of 2,000 were caused to react for 3 hours under an 80° C. nitrogen atmosphere, yielding a prepolymer containing NCO at 8.8%. On the other hand, 14.9 parts by mass of PBA having a molecular weight of 1,000 (product name "NIPPOLLAN 4009" (produced by Nippon Polyurethane Industry Co., Ltd.)), 2.6 parts by mass of 1,4-butanediol (1,4-BD), 2.1 parts by mass of trimethylolpropane (TMP), and the same curing catalysts as those used in Example 1 were mixed, yielding a curing agent. The curing catalysts were contained at the same ratios as those in Example 1. The thus obtained polyurethane composition was subjected to the same processes as those in Example 1, to thereby produce a developer amount regulating blade. The developer amount regulating blade was evaluated in the same manner as that in Example 1. Table 1 shows the results of the evaluation.

Note that Table 1 shows the values of (E)/(B), which is the mass ratio of polybutylene adipate polyester polyol (PBA) having a number average molecular weight of 1,000 corresponding to the polyol (E) to polybutylene adipate polyester polyol (PBA) having a number average molecular weight of 2,000 corresponding to the polyol (B) in the polyurethane composition, and also shows the number average molecular weight in total of the above-mentioned polyols.

Example 3

PEA2000

A developer amount regulating blade was produced in the same manner as that in Example 1, except that polyethylene adipate polyol (PEA) having a number average molecular weight of 2,000 (product name "NIPPOLLAN 4040" (produced by Nippon Polyurethane Industry Co., Ltd.)) was used as the polyol (B), and the feeding amounts were changed to those listed in Table 1. Further, evaluation was performed in the same manner as that in Example 1. Table 1 shows the results of the evaluation.

Example 4

A developer amount regulating blade was produced and evaluated in the same manner as that in Example 1, except that a material as preliminarily produced polybutylene adipate polyester polyol (PBA) having a number average molecular weight of 4,000 was used as the polyol (B), and the feeding amounts were changed to those listed in Table 1. Table 1 shows the results of the evaluation.

Example 5

A developer amount regulating blade was produced in the same manner as that in Example 1, except that polybutylene adipate polyester polyol (PBA) having a number average molecular weight of 1,000 (product name "NIPPOLLAN 4009" (produced by Nippon Polyurethane Industry Co., Ltd.)) was used as the polyol (B), and the feeding amounts were changed to those listed in Table 1. Further, evaluation was performed in the same manner as that in Example 1. Table 1 shows the results of the evaluation.

Example 6

Viscosity: 500 mPa·s 35.9 parts by mass of 4,4'-diphenylmethane diisocyanate (MDI) and 34.7 parts by mass of polybutylene adipate polyester polyol (PBA) having a molecular weight of 2,000 were caused to react for 3 hours under an 80° C. nitrogen atmosphere, yielding a prepolymer containing NCO at 15%. On the other hand, 22.3 parts by mass of PBA having a molecular weight of 1,000, 3.9 parts by mass of 1,4-butanediol (1,4-BD), 3.2 parts by mass of trimethylolpropane (TMP), and the same curing catalysts as those used in Example 1 were mixed, yielding a curing agent. The curing catalysts were contained at the same ratios as those in Example 1. The mixed polyurethane composition had a viscosity of 500 mPa·s.

The same subsequent process as that in Example 1 was carried out, to thereby produce and evaluate a developer amount regulating blade. Table 1 shows the results of the evaluation.

Example 7

Viscosity: 3,000 mPa·s 21.4 parts by mass of 4,4'-diphenylmethane diisocyanate (MDI) and 66.4 parts by mass of polybutylene adipate polyester polyol (PBA) having a molecular weight of 2,000 were caused to react for 3 hours under an 80° C. nitrogen atmosphere, yielding a prepolymer containing NCO at 5%. On the other hand, 9.3 parts by mass of PBA having a molecular weight of 1,000, 1.6 parts by mass of 1,4-butanediol (1,4-BD), 1.3 parts by mass of trimethylolpropane (TMP), and the same curing catalysts as those used in Example 1 were mixed, yielding a curing agent. The curing catalysts were contained at the same ratios as those in Example 1. The mixed polyurethane composition had a viscosity of 3,000 mPa·s.

The same subsequent process as that in Example 1 was carried out, to thereby produce and evaluate a developer amount regulating blade. Table 1 shows the results of the evaluation.

Example 8

In Example 2, the content of the isocyanurate-forming catalyst as a polyurethane-curing catalyst in a polyurethane composition was adjusted to 20 ppm. Further, the content of the urethane-forming catalyst as another polyurethane-curing catalyst in the polyurethane composition was adjusted to 200 ppm.

The contents of the other materials in the polyurethane composition remained the same as those in Example 2, to thereby produce an electrophotographic blade member. Then, the same subsequent process as that in Example 1 was carried out on the electrophotographic blade member, thereby yielding a developer amount regulating blade. The thus obtained developer amount regulating blade was evaluated in the same manner as that in Example 1. Table 1 shows the results of the evaluation.

Example 9

In Example 2, the content of the isocyanurate-forming catalyst as a polyurethane-curing catalyst in the polyurethane composition was adjusted to 20 ppm. Further, the content of the urethane-forming catalyst as another polyurethane-curing catalyst in the polyurethane composition was adjusted to 1,500 ppm.

The contents of the other materials in the polyurethane composition remained the same as those in Example 2, to thereby produce an electrophotographic blade member. Then, the same subsequent process as that in Example 1 was carried out on the electrophotographic blade member, thereby yielding a developer amount regulating blade. The thus obtained developer amount regulating blade was evaluated in the same manner as that in Example 1. Table 1 shows the results of the evaluation.

Example 10

In Example 2, the content of the isocyanurate-forming catalyst as a polyurethane-curing catalyst in the polyurethane composition was adjusted to 500 ppm. Further, the content of the urethane-forming catalyst as another polyurethane-curing catalyst in the polyurethane composition was adjusted to 200 ppm.

The contents of the other materials in the polyurethane composition remained the same as those in Example 2, to thereby produce an electrophotographic blade member. Then, the same subsequent process as that in Example 1 was carried out on the electrophotographic blade member, thereby yielding a developer amount regulating blade. The thus obtained developer amount regulating blade was evaluated in the same manner as that in Example 1. Table 1 shows the results of the evaluation.

Example 11

In Example 2, the content of the isocyanurate-forming catalyst as a polyurethane-curing catalyst in the polyurethane composition was adjusted to 500 ppm. Further, the content of the urethane-forming catalyst as another polyurethane-curing catalyst in the polyurethane composition was adjusted to 1,500 ppm.

The contents of the other materials in the polyurethane composition remained the same as those in Example 2, to thereby produce an electrophotographic blade member. Then, the same subsequent process as that in Example 1 was carried out on the electrophotographic blade member, thereby yielding a developer amount regulating blade. The thus obtained developer amount regulating blade was evaluated in the same manner as that in Example 1. Table 1 shows the results of the evaluation.

Comparative Example 1

A developer amount regulating blade was produced and evaluated in the same manner as that in Example 1, except that polybutylene adipate polyester polyol (PBA) having a number average molecular weight of 800 was used as the polyol (B), and the feeding amounts were changed to those listed in Table 2. Table 2 shows the results of the evaluation.

Comparative Example 2

A developer amount regulating blade was produced and evaluated in the same manner as that in Example 1, except that polybutylene adipate polyester polyol (PBA) having a number average molecular weight of 4,500 was used as the polyol (B), and the feeding amounts were changed to those listed in Table 2. Table 2 shows the results of the evaluation.

Comparative Example 3

41.2 parts by mass of 4,4'-diphenylmethane diisocyanate (MDI) and 23.1 parts by mass of polybutylene adipate polyester polyol (PBA) having a molecular weight of 2,000 were caused to react for 3 hours under an 80° C. nitrogen atmosphere, yielding a prepolymer containing NCO at 20%. On the other hand, 27.1 parts by mass of PBA having a molecular weight of 1,000, 4.7 parts by mass of 1,4-butanediol (1,4-BD), 3.9 parts by mass of trimethylolpropane (TMP), and the same curing catalysts as those used in Example 1 were mixed, yielding a curing agent. The curing catalysts were contained at the same ratios as those in Example 1. The mixed polyurethane composition had a viscosity of 420 mPa·s.

The same subsequent process as that in Example 1 was carried out, to thereby produce and evaluate a developer amount regulating blade. Table 2 shows the results of the evaluation.

Comparative Example 4

21.4 parts by mass of 4,4'-diphenylmethane diisocyanate (MDI) and 66.4 parts by mass of polybutylene adipate polyester polyol (PBA) having a molecular weight of 2,000 were caused to react for 3 hours under an 80° C. nitrogen atmosphere, yielding a prepolymer containing NCO at 5%. On the other hand, 9.3 parts by mass of PBA having a molecular weight of 1,000, 1.6 parts by mass of 1,4-butanediol (1,4-BD), 1.3 parts by mass of trimethylolpropane (TMP), and the same curing catalysts as those used in Example 1 were mixed, yielding a curing agent. The curing catalysts were contained at the same ratios as those in Example 1. The thus obtained materials were fed into a two-liquid measuring, mixing, and dispensing machine. While the materials were uniformly stirred and mixed in a mixing head, the machine was adjusted so that a polyurethane composition remained in the mixing head until the polyurethane composition had a viscosity of 3,800 mPa·s at the time of its discharge.

The same subsequent process as that in Example 1 was carried out, to thereby produce and evaluate a developer amount regulating blade. Table 2 shows the results of the evaluation.

Comparative Example 5

In Example 2, the content of the isocyanurate-forming catalyst as a polyurethane-curing catalyst in the polyurethane composition was adjusted to 15 ppm. Further, the content of the urethane-forming catalyst as another polyurethane-curing catalyst in the polyurethane composition was adjusted to 180 ppm.

The contents of the other materials in the polyurethane composition remained the same as those in Example 2, to thereby produce an electrophotographic blade member. Then, the same subsequent process as that in Example 1 was carried out on the electrophotographic blade member, thereby yielding a developer amount regulating blade. The thus obtained developer amount regulating blade was evaluated in the same manner as that in Example 1. Table 2 shows the results of the evaluation.

Comparative Example 6

In Example 2, the content of the isocyanurate-forming catalyst as a polyurethane-curing catalyst in the polyurethane composition was adjusted to 600 ppm. Further, the content of the urethane-forming catalyst as another polyurethane-curing catalyst in the polyurethane composition was adjusted to 180 ppm.

The contents of the other materials in the polyurethane composition remained the same as those in Example 2, to thereby produce an electrophotographic blade member. Then, the same subsequent process as that in Example 1 was carried out on the electrophotographic blade member, thereby yielding a developer amount regulating blade. The thus obtained developer amount regulating blade was evaluated in the same manner as that in Example 1. Table 2 shows the results of the evaluation.

Comparative Example 7

In Example 2, the content of the isocyanurate-forming catalyst as a polyurethane-curing catalyst in the polyurethane composition was adjusted to 15 ppm. Further, the content of the urethane-forming catalyst as another polyurethane-curing catalyst in the polyurethane composition was adjusted to 1,520 ppm.

The contents of the other materials in the polyurethane composition remained the same as those in Example 2, to thereby produce an electrophotographic blade member. Then, the same subsequent process as that in Example 1 was carried out on the electrophotographic blade member, thereby yielding a developer amount regulating blade. The thus obtained developer amount regulating blade was evaluated in the same manner as that in Example 1. Table 2 shows the results of the evaluation.

Comparative Example 8

In Example 2, the content of the isocyanurate-forming catalyst as a polyurethane-curing catalyst in the polyurethane composition was adjusted to 600 ppm. Further, the content of the urethane-forming catalyst as another polyurethane-curing catalyst in the polyurethane composition was adjusted to 1,520 ppm.

The contents of the other materials in the polyurethane composition remained the same as those in Example 2, to thereby produce an electrophotographic blade member. Then, the same subsequent process as that in Example 1 was carried out on the electrophotographic blade member, thereby yielding a developer amount regulating blade. The thus obtained developer amount regulating blade was evaluated in the same manner as that in Example 1. Table 2 shows the results of the evaluation.

Comparative Example 9

The arrangement position of a polyurethane composition prepared in the same manner as that in Example 2 was set to a summit 27 of the molding drum 18 in FIG. 1. The discharge position of the polyurethane composition was set to the position 5 mm above the arrangement position in the vertical direction. The same method as that in Example 1 except the above was carried out to produce a developer amount regulating blade, followed by evaluation. Table 2 shows the results of the evaluation.

The above-mentioned results show that, in each of the examples, even when a polyurethane composition having a fast curing speed was used, irregularities of physical properties such as hardness decreased, occurrence of marks in appearance and occurrence of intrusion of air bubbles reduced, and image evaluation was good. On the other hand, in each of the comparative examples, the hardness difference of a polyurethane resin after curing was large, marks caused by irregular curing occurred on the surface, intrusion of air bubbles and foreign matter occurred, and image defects occurred.

Note that when the above-mentioned materials other than those used in examples were used as a polyisocyanate, an adipate-based polyester polyol, a chain extender, an isocyanurate-forming catalyst, and a urethane-forming catalyst, the same results as those in examples were obtained.

Further, a molding drum on which a continuous molding groove having a depth of 2 mm was formed was used to produce each electrophotographic blade member having a thickness of 2 mm in the same manner as that in each of the examples. The electrophotographic blade member was bonded to a supporting member as in Example 1, to thereby yield a cleaning blade. The resultant cleaning blade was incorporated into a cartridge for a "LASER SHOT-LBP" (product name, produced by Canon Inc.) to check image streaks caused by defective cleaning. The results of each example show that cleaning functions are good and images are good. However, in each comparative example, image streaks occurred because edge portions of an electrophotographic blade member chipped and toner slipped through the broken edge portions, causing defective cleaning.

TABLE 1

| Item | | | Example 1 | Example 2 | Example 3 | Example 4 | Example 5 | Example 6 |
|---|---|---|---|---|---|---|---|---|
| Preparation of prepolymer | | | | | | | | |
| Polyisocyanate (A) | Type | | 4,4'-MDI | 4,4'-MDI | 4,4'-MDI | 4,4'-MDI | 4,4'-MDI | 4,4'-MDI |
| | Amount (g) | | 32.0 | 27.7 | 32.0 | 28.4 | 38.1 | 35.9 |
| Polyol (B) | Type | | PBA | PBA | PEA | PBA | PBA | PBA |
| | Number average molecular weight | | 2,000 | 2,000 | 2,000 | 4,000 | 1,000 | 2,000 |
| | Amount (g) | | 61.0 | 52.7 | 61.0 | 64.6 | 54.9 | 34.7 |
| NCO (%) | | | 8.8% | 8.8% | 8.8% | 8.8% | 8.8% | 15.0% |
| Preparation of curing agent | | | | | | | | |
| Chain extender (C) (1) | Type | | 1,4-BD | 1,4-BD | 1,4-BD | 1,4-BD | 1,4-BD | 1,4-BD |
| | Molecular weight | | 90.1 | 90.1 | 90.1 | 90.1 | 90.1 | 90.1 |
| | Amount (g) | | 3.9 | 2.6 | 3.9 | 3.9 | 3.9 | 3.9 |
| Chain extender (C) (2) | Type | | TMP | TMP | TMP | TMP | TMP | TMP |
| | Molecular weight | | 134.2 | 134.2 | 134.2 | 134.2 | 134.2 | 134.2 |
| | Amount (g) | | 3.2 | 2.1 | 3.2 | 3.2 | 3.2 | 3.2 |
| Polyol (E) | Type | | — | PBA | — | — | — | PBA |
| | Number average molecular weight | | — | 1,000 | — | — | — | 1,000 |
| | Amount (g) | | — | 14.9 | — | — | — | 22.3 |
| Urethane-curing catalyst | | | | | | | | |
| Curing catalyst (D) | Isocyanurate-forming catalyst | Type | P15 | P15 | P15 | P15 | P15 | P15 |
| | | Amount (ppm) | 80 | 80 | 80 | 80 | 80 | 80 |
| | Urethane-forming catalyst | Type | DABCO | DABCO | DABCO | DABCO | DABCO | DABCO |
| | | Amount (ppm) | 340 | 340 | 340 | 340 | 340 | 340 |
| (E)/(B) | | | — | 0.28 | — | — | — | 0.64 |
| Number average molecular weight in total of polyol (B) and polyol (E) | | | 2000 | 1,780 | 2,000 | 4,000 | 1,000 | 1,600 |
| Viscosity mPa·s | | | 1,400 | 1,300 | 1,400 | 2,000 | 1,200 | 500 |
| Height from point at which injected polyurethane composition arrives to discharging outlet (mm) | | | 5 | 5 | 5 | 5 | 5 | 5 |
| Distance from portion at which molding drum and endless belt are first brought into contact to point at which polyurethane composition is injected (mm) | | | 5 | 5 | 5 | 5 | 5 | 5 |
| Evaluation results | | | | | | | | |
| Rubber hardness (IRHD°) | | | 67 | 68 | 67 | 67 | 66 | 68 |
| Hardness difference (difference between maximum value and minimum value) (IRHD°) | | | 0 | 0 | 0 | 0 | 0 | 0 |
| Surface mark | | | A | A | A | A | A | A |
| Intrusion of air bubble | | | A | A | A | A | A | A |
| Intrusion of foreign matter | | | A | A | A | A | A | A |
| Image results Ghost | | | A | A | A | A | A | A |
| Image streak | | | A | A | A | A | A | A |

| Item | | | Example 7 | Example 8 | Example 9 | Example 10 | Example 11 |
|---|---|---|---|---|---|---|---|
| Preparation of prepolymer | | | | | | | |
| Polyisocyanate (A) | Type | | 4,4'-MDI | 4,4'-MDI | 4,4'-MDI | 4,4'-MDI | 4,4'-MDI |
| | Amount (g) | | 21.4 | 27.7 | 27.7 | 27.7 | 27.7 |
| Polyol (B) | Type | | PBA | PBA | PBA | PBA | PBA |
| | Number average molecular weight | | 2,000 | 2,000 | 2,000 | 2,000 | 2,000 |
| | Amount (g) | | 66.4 | 52.7 | 52.7 | 52.7 | 52.7 |
| NCO (%) | | | 5.0% | 8.8% | 8.8% | 8.8% | 8.8% |
| Preparation of curing agent | | | | | | | |
| Chain extender (C) (1) | Type | | 1,4-BD | 1,4-BD | 1,4-BD | 1,4-BD | 1,4-BD |
| | Molecular weight | | 90.1 | 90.1 | 90.1 | 90.1 | 90.1 |
| | Amount (g) | | 1.6 | 2.6 | 2.6 | 2.6 | 2.6 |
| Chain extender (C) (2) | Type | | TMP | TMP | TMP | TMP | TMP |
| | Molecular weight | | 134.2 | 134.2 | 134.2 | 134.2 | 134.2 |
| | Amount (g) | | 1.3 | 2.1 | 2.1 | 2.1 | 2.1 |
| Polyol (E) | Type | | PBA | PBA | PBA | PBA | PBA |
| | Number average molecular weight | | 1,000 | 1,000 | 1,000 | 1,000 | 1,000 |
| | Amount (g) | | 9.3 | 14.9 | 14.9 | 14.9 | 14.9 |

TABLE 1-continued

| | | | | | | | |
|---|---|---|---|---|---|---|---|
| Urethane-curing catalyst | | | | | | | |
| Curing catalyst (D) | Isocyanurate-forming catalyst | Type | P15 | P15 | P15 | P15 | P15 |
| | | Amount (ppm) | 80 | 20 | 20 | 500 | 500 |
| | Urethane-forming catalyst | Type | DABCO | DABCO | DABCO | DABCO | DABCO |
| | | Amount (ppm) | 340 | 200 | 1,500 | 200 | 1,500 |
| (E)/(B) | | | 0.14 | 0.28 | 0.28 | 0.28 | 0.28 |
| Number average molecular weight in total of polyol (B) and polyol (E) | | | 1,880 | 1,780 | 1,780 | 1,780 | 1,780 |
| Viscosity | mPa·s | | 3,000 | 1,400 | 1,400 | 1,400 | 1,400 |
| Height from point at which injected polyurethane composition arrives to discharging outlet (mm) | | | 5 | 5 | 5 | 5 | 5 |
| Distance from portion at which molding drum and endless belt are first brought into contact to point at which polyurethane composition is injected (mm) | | | 5 | 5 | 5 | 5 | 5 |
| Evaluation results | | | | | | | |
| Rubber hardness | (IRHD°) | | 66 | 66 | 69 | 65 | 68 |
| Hardness difference (difference between maximum value and minimum value) | (IRHD°) | | 0 | 0 | 0 | 0 | 0 |
| Surface mark | | | A | A | A | A | A |
| Intrusion of air bubble | | | A | A | A | A | A |
| Intrusion of foreign matter | | | A | A | A | A | A |
| Image results Ghost | | | A | A | A | A | A |
| Image streak | | | A | A | A | A | A |

TABLE 2

| | Item | | Comparative Example 1 | Comparative Example 2 | Comparative Example 3 | Comparative Example 4 | Comparative Example 5 |
|---|---|---|---|---|---|---|---|
| Preparation of prepolymer | | | | | | | |
| Polyisocyanate (A) | Type | | 4,4'-MDI | 4,4'-MDI | 4,4'-MDI | 4,4'-MDI | 4,4'-MDI |
| | Amount (g) | | 40.7 | 28.0 | 41.2 | 21.4 | 27.7 |
| Polyol (B) | Type | | PBA | PBA | PBA | PBA | PBA |
| | Number average molecular weight | | 800 | 4,500 | 2,000 | 2,000 | 2,000 |
| | Amount (g) | | 52.3 | 65.0 | 23.1 | 66.4 | 52.7 |
| NCO (%) | | | 8.8% | 8.8% | 20.0% | 5.0% | 8.8% |
| Preparation of curing agent | | | | | | | |
| Chain extender (C) (1) | Type | | 1,4-BD | 1,4-BD | 1,4-BD | 1,4-BD | 1,4-BD |
| | Molecular weight | | 90.1 | 90.1 | 90.1 | 90.1 | 90.1 |
| | Amount (g) | | 3.9 | 3.9 | 4.7 | 1.6 | 2.6 |
| Chain extender (C) (2) | Type | | TMP | TMP | TMP | TMP | TMP |
| | Molecular weight | | 134.2 | 134.2 | 134.2 | 134.2 | 134.2 |
| | Amount (g) | | 3.2 | 3.2 | 3.9 | 1.3 | 2.1 |
| Polyol (E) | Type | | — | — | PBA | PBA | PBA |
| | Number average molecular weight | | — | — | 1,000 | 1,000 | 1,000 |
| | Amount (g) | | — | — | 27.1 | 9.3 | 14.9 |
| Urethane-curing catalyst | | | | | | | |
| Curing catalyst (D) | Isocyanurate-forming catalyst | Type | P15 | P15 | P15 | P15 | P15 |
| | | Amount (ppm) | 80 | 80 | 80 | 80 | 15 |
| | Urethane-forming catalyst | Type | DABCO | DABCO | DABCO | DABCO | DABCO |
| | | Amount (ppm) | 340 | 340 | 340 | 340 | 180 |
| (E)/(B) | | | — | — | 1.17 | 0.14 | 0.28 |
| Number average molecular weight in total of polyol (B) and polyol (E) | | | 800 | 4,500 | 1,460 | 1,880 | 1,780 |
| Viscosity | mPa·s | | 550 | 2,000 | 420 | 3,800 | 1,200 |
| Height from point at which injected polyurethane composition arrives to discharging outlet (mm) | | | 5 | 5 | 5 | 5 | 5 |

TABLE 2-continued

| | | | | | | |
|---|---|---|---|---|---|---|
| Distance from portion at which molding drum and endless belt are first brought into contact to point at which polyurethane composition is injected (mm) | | 5 | 5 | 5 | 5 | 5 |

Evaluation results

| | | | | | | |
|---|---|---|---|---|---|---|
| Rubber hardness (average value) | (IRHD°) | 60 | 68 | 70 | 67 | 66 |
| Hardness difference (difference between maximum value and minimum value) | (IRHD°) | 0 | 2 | 3 | 3 | 5 |
| Surface mark | | B | C | C | C | C |
| Intrusion of air bubble | | B | B | C | C | B |
| Intrusion of foreign matter | | B | B | B | C | A |
| Image results Ghost | | C | C | C | C | C |
| Image streak | | C | C | C | C | C |

| Item | | | Comparative Example 6 | Comparative Example 7 | Comparative Example 8 | Comparative Example 9 |
|---|---|---|---|---|---|---|
| Preparation of prepolymer | | | | | | |
| Polyisocyanate (A) | Type | | 4,4'-MDI | 4,4'-MDI | 4,4'-MDI | 4,4'-MDI |
| | Amount (g) | | 27.7 | 27.7 | 27.7 | 27.7 |
| Polyol (B) | Type | | PBA | PBA | PBA | PBA |
| | Number average molecular weight | | 2,000 | 2,000 | 2,000 | 2,000 |
| | Amount (g) | | 52.7 | 52.7 | 52.7 | 52.7 |
| NCO (%) | | | 8.8% | 8.8% | 8.8% | 8.8% |
| Preparation of curing agent | | | | | | |
| Chain extender (C) (1) | Type | | 1,4-BD | 1,4-BD | 1,4-BD | 1,4-BD |
| | Molecular weight | | 90.1 | 90.1 | 90.1 | 90.1 |
| | Amount (g) | | 2.6 | 2.6 | 2.6 | 2.6 |
| Chain extender (C) (2) | Type | | TMP | TMP | TMP | TMP |
| | Molecular weight | | 134.2 | 134.2 | 134.2 | 134.2 |
| | Amount (g) | | 2.1 | 2.1 | 2.1 | 2.1 |
| Polyol (E) | Type | | PBA | PBA | PBA | PBA |
| | Number average molecular weight | | 1,000 | 1,000 | 1,000 | 1,000 |
| | Amount (g) | | 14.9 | 14.9 | 14.9 | 14.9 |
| Urethane-curing catalyst | | | | | | |
| Curing catalyst (D) | Isocyanurate-forming catalyst | Type | P15 | P15 | P15 | P15 |
| | | Amount (ppm) | 600 | 15 | 600 | 80 |
| | Urethane-forming catalyst | Type | DABCO | DABCO | DABCO | DABCO |
| | | Amount (ppm) | 180 | 1520 | 1520 | 340 |
| (E)/(B) | | | 0.28 | 0.28 | 0.28 | 0.28 |
| Number average molecular weight in total of polyol (B) and polyol (E) | | | 1,780 | 1,780 | 1,780 | 1,780 |
| Viscosity | mPa·s | | 500 | 3,000 | 1,400 | 1,300 |
| Height from point at which injected polyurethane composition arrives to discharging outlet (mm) | | | 5 | 5 | 5 | 5 |
| Distance from portion at which molding drum and endless belt are first brought into contact to point at which polyurethane composition is injected (mm) | | | 5 | 5 | 5 | Summit of molding drum |

Evaluation results

| | | | | | | |
|---|---|---|---|---|---|---|
| Rubber hardness (average value) | (IRHD°) | | 62 | 67 | 65 | 66 |
| Hardness difference (difference between maximum value and minimum value) | (IRHD°) | | 5 | 5 | 5 | 8 |
| Surface mark | | | C | C | C | C |
| Intrusion of air bubble | | | C | B | B | C |
| Intrusion of foreign matter | | | B | C | C | C |
| Image results Ghost | | | C | C | C | C |
| Image streak | | | C | C | C | C |

According to the present invention, it is possible to provide the production method and the production apparatus, for continuously molding a high-quality, electrophotographic blade member having less irregularities of physical properties such as hardness and exhibiting less occurrence of marks in appearance and less occurrence of intrusion of air bubbles, by using the polyurethane composition for a short curing time.

In addition, according to the present invention, it is possible to provide the production apparatus that is capable of continuously producing a high-quality, electrophotographic blade member using a polyurethane resin including a polyurethane composition for a short curing time, the production apparatus exhibiting high production efficiency, having such a structure as easily realizing automation, and contributing to reducing facility cost.

Besides, according to the present invention, it is possible to provide the inexpensive, high-quality blade not only to the field of electrophotographic technology but also to other fields in which blades are used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-072928, filed Mar. 26, 2010, and No. 2010-256854, filed Nov. 17, 2010 which are hereby incorporated by reference herein in their entirety.

What is claimed is:

1. A method of producing an electrophotographic blade member, comprising:
   (i) providing a molding drum having a continuous molding groove on an outer peripheral surface thereof and an endless belt which is brought into contact with a part of the outer peripheral surface of the molding drum;
   (ii) providing a polyurethane composition containing:
      (A) a polyisocyanate;
      (B) an adipate-based polyester polyol having a number average molecular weight of 1,000 to 4,000;
      (C) a chain extender having a molecular weight of 200 or less; and
      (D) an isocyanurate-forming catalyst at 20 ppm or more and 500 ppm or less and a urethane-forming catalyst at 200 ppm or more and 1,500 ppm or less as curing catalysts,
      and the polyurethane composition gin a viscosity of 500 mPa·s or more and 3,000 mPa·s or less;
   (iii) applying the polyurethane resin composition on the endless belt at a first position opposing the molding groove, the first position being away from a second position at which the molding drum and the endless belt are first brought into contact with each other on an upstream side with respect to a moving direction of the endless belt;
   (iv) filling the continuous molding groove with the polyurethane resin composition by bringing the endless belt on which the polyurethane resin composition has been applied in the step (iii) into contact with the molding drum;
   (v) thermosetting the polyurethane resin composition filled in the continuous molding groove and forming a polyurethane resin;
   (vi) releasing the polyurethane resin resulting from the step (v) from the molding drum; and
   (vii) cutting the polyurethane resin and forming the electrophotographic blade member,
   wherein, in the step (iii), an amount of the polyurethane resin composition applied onto the endless belt in the step (iii) corresponds to a space portion between the molding groove and the endless belt, the space portion being formed when the endless belt is brought into contact with the molding drum in the step (iv).

2. The method of producing an electrophotographic blade member according to claim 1, wherein:
   in the step (iii), applying the polyurethane resin composition on the endless belt, at the first position opposing the molding groove, the first position being 5 mm or more and 350 mm or less away from the second position at which the molding drum and the endless belt are first brought into contact with each other on the upstream side with respect to the moving direction of the endless belt; and
   the polyurethane composition is discharged from a third position 5 mm or more and 200 mm or less above the first position in a vertical direction.

3. The method of producing an electrophotographic blade member according to claim 1, wherein:
   the polyurethane composition further contains: (E) a polyol having a number average molecular weight smaller than the number average molecular weight of the adipate-based polyester polyol (B) and larger than the molecular weight of the chain extender (C).

4. The method of producing an electrophotographic blade member according to claim 3, wherein:
   (E)/(B), which is a mass ratio of the polyol (E) to the adipate-based polyester polyol (B) in the polyurethane composition, is between 0.02 and 0.60; and
   a number average molecular weight in total of the adipate-based polyester polyol (B) and the polyol (E) is between 1,000 and 3,000.

5. The method of producing an electrophotographic blade member according to claim 1, wherein the molding drum is subjected to releasing treatment at least at a portion with which the polyurethane composition is brought into contact.

6. The method of producing an electrophotographic blade member according to claim 1, wherein the endless belt is subjected to releasing treatment at least at a portion with which the polyurethane composition is brought into contact.

7. The method of producing an electrophotographic blade member according to claim 1, wherein a bottom surface of the molding groove of the molding drum comprises a rough surface portion at least at one corner.

\* \* \* \* \*